United States Patent [19]

Maillard

[11] Patent Number: 4,761,100
[45] Date of Patent: Aug. 2, 1988

[54] METHOD OF TAPPING ON A PRESS, AND APPARATUS FOR IMPLEMENTING THE METHOD

[75] Inventor: Jacques Maillard, L'Etang la Ville, France

[73] Assignee: La Telemecanique Electrique, Nanterre, France

[21] Appl. No.: 907,814

[22] Filed: Sep. 16, 1986

[30] Foreign Application Priority Data

Sep. 20, 1985 [FR] France ................... 85 13994

[51] Int. Cl.⁴ .............................................. B23G 3/00
[52] U.S. Cl. ................... 408/1 R; 10/129 A; 29/560; 408/124; 408/130
[58] Field of Search ............... 408/98, 124, 129, 130, 408/1; 10/129 R, 129 A; 29/560

[56] References Cited

U.S. PATENT DOCUMENTS

| | | | |
|---|---|---|---|
| 2,981,961 | 5/1961 | Molitor | 408/130 |
| 3,162,873 | 12/1964 | Ohmz | 10/139 R X |
| 3,200,426 | 8/1965 | Barr | 408/130 X |
| 3,530,520 | 1/1968 | Milewski et al. | 408/98 |
| 3,630,630 | 12/1971 | Nyman | 408/130 X |
| 4,449,868 | 5/1984 | Steinsberger et al. | 408/129 X |
| 4,473,330 | 9/1984 | Chalier | 408/98 |

Primary Examiner—Z. R. Bilinsky
Attorney, Agent, or Firm—Murray and Whisenhunt

[57] ABSTRACT

Tapping apparatus comprising: a body (5) suitable for being mounted on a moving element (4) of a press; a system of multiplying gears (14) having their axes parallel to the direction (F) of motion of said element, and placed on said body; a motion transforming device having a large pitch screw (26) and nut (27) for transforming the linear stroke of said element into a rotary motion which is applied to a first gear wheel of the system; and a tapping head (18) which is rotated by the last gear wheel (17) of the system and which is driven in translation by the body, said head comprising a fixed casing (32), a spindle (36) which pivots in said casing and is rotated by the last gear wheel (17) and a tool-carrying clamp (51) which is rotated by the spindle and which is capable of longitudinal displacement against pneumatic return means ($F_d$) of adjustable force.

Applicable to machine tools.

10 Claims, 3 Drawing Sheets

METHOD OF TAPPING ON A PRESS, AND APPARATUS FOR IMPLEMENTING THE METHOD

The present invention relates to a method of automatically tapping parts disposed in a metal strip which is displaced stepwise between a fixed table of a cutting press and its moving plate which carries a mechanism suitable for transforming its stroke into an alternating rotary motion of amplitude proportional to the stroke in order to communicate said motion to a tapping head which is driven along its axis of rotation by the plate and whose tap-carrier which is movable relative to the head is subjected firstly to a force in a direction parallel to the above-specified axis of rotation and secondly to said rotary motion.

The present invention which also relates to an automatic tapping apparatus suitable for implementing the above-defined method is advantageously used in production lines where the parts coming from a metal strip and carried thereby are machined in stages by each of the punches of a multiplicity of tools placed one behind the other beneath the plate of a press, and where one of said tools is constituted by a tap or a die which is required to provide a thread in an opening in the part during the stroke of the plate, said opening having been made during an earlier machining stage.

BACKGROUND OF THE INVENTION

An apparatus having the general construction mentioned above is already known, for example, from French Pat. No. 1 444 213, in which the die-carrier and a cylinder in which it is internally guided are associated with each other by a finger sliding in a helical groove, this coupling system allows the tap-carrier to find a suitable longitudinal position, and then communicates a force in the same direction together with a rotary couple, but it needs to be designed for repetitive working conditions which are known in advance. Consequently, it is less well adapted to tapping holes of different diameters or to tapping holes of the same diameter but presented in parts of different materials.

Attempts have been made to give the tapping head a facility for adaptation by disposing a longitudinal spring between the cylinder and a tap-carrier which is angularly driven thereby. In addition to the numerous spring breakages which have been observed using these means, mention must also be made of the drawback which results from the impossibility of adjusting the force: neither its initial value nor its subsequent evolution can be adjusted.

Further, when using prior methods and apparatuses, dispersions in the useful height of the thread provided or else modifications in the shape of the initial threads are observed; these defects can be considered as secondary only if the parts to be threaded are solid or very thick, and they become far too important when they appear on parts formed from a metal strip where the height of the threaded portions cannot exceed the height which can be obtained by drawing out the metal to an extent which is necessarily limited.

Consequently, the invention proposes firstly to define a tapping method and secondly to provide an apparatus for implementing the method, whereby the user will benefit not only from an improved facility for adaptation to the dimensions of the holes to be machined and to the materials of the parts containing the holes, but also from better quality and improved manufacturing safety, accompanied by a higher manufacturing throughput.

SUMMARY OF THE INVENTION

In a method according to the invention, the desired aim is achieved by virtue of the facts that: before each tapping operation, the above-specified tap-carrier has an axial pneumatic force applied thereto, which force is selected to be substantially constant and directed towards the part to be tapped, and that the application of said force is interrupted at the moment when the tap is engaged in said part over a sufficient length for ensuring that it continues to penetrate therein solely under the effect of the rotary couple which is communicated thereto.

According to the invention, an apparatus for implementing the above-defined method and suitable for providing the expected result is special in that the tap-carrier takes the form of an actuator rod which is constrained to rotate with the cylinder which is in turn driven in rotation and which receives pressure in a chamber that is sealed by disposing concentric sealing means between the tap-carrier and the cylinder and a casing in which the cylinder is rotatably mounted.

BRIEF DESCRIPTION OF THE DRAWINGS

Other features of the invention appear better from reading the following description and examining the accompanying figures in which.

DETAILED DESCRIPTION OF THE INVENTION

Figure 1:
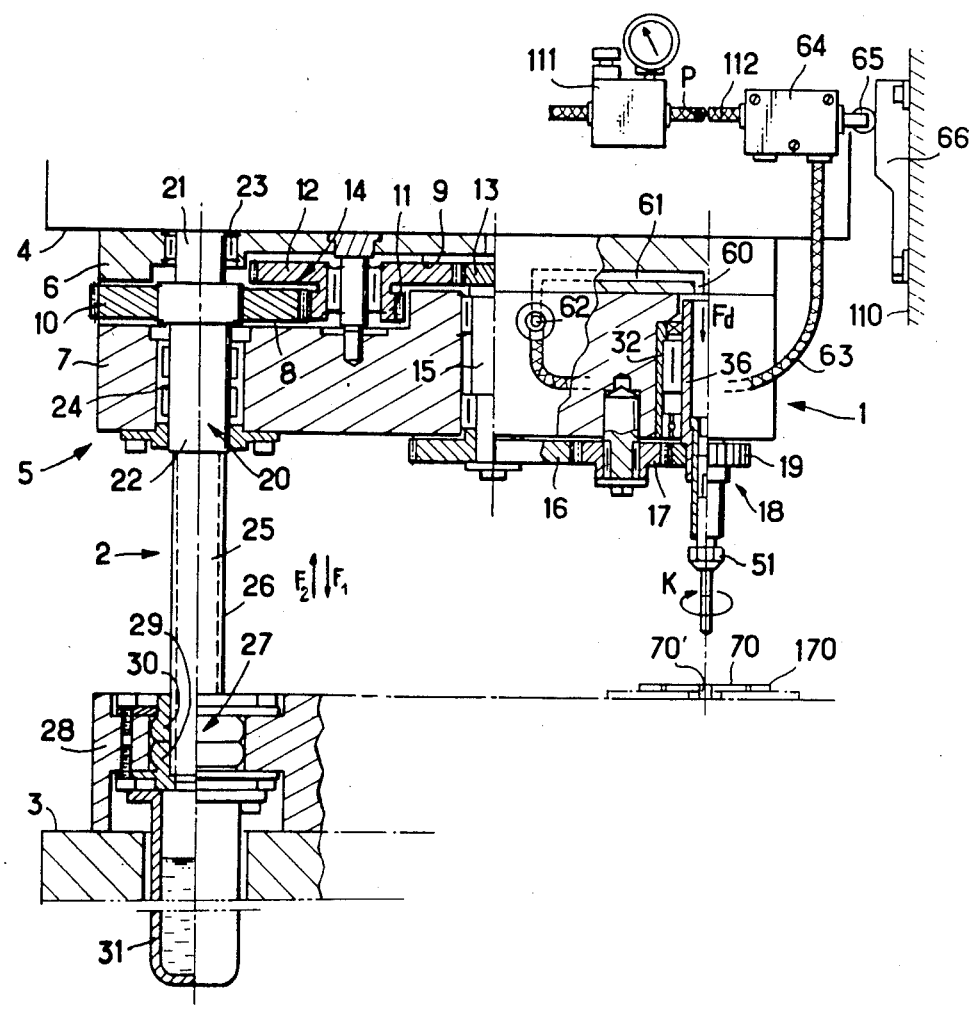
FIG. 1 shows an automatic tapping apparatus installed between the table and the plate of a press whose other elements are not shown.

The tapping apparatus 1 shown in FIG. 1 is installed in a space 2 which is situated between a fixed table 3 of a press and a moving plate or element 4 of said press which moves towards or away from said table longitudinally in directions $F_1 F_2$.

The apparatus comprises a body 5 which is fixed on the moving element 4 and which is constituted by assembling two half-bodies 6 and 7 having recesses 8 and 9 disposed therebetween suitable for receiving various gearwheels 10, 11, 12, and 13 of a step-up gear train 14, with the shafts of the gearwheels being mounted to rotate between said half-bodies; the gearwheel 13 is keyed to a through-shaft 15 which is fixed to a gearwheel 16 which in turn drives a gearwheel 17.

A tapping or threading head 18 whose construction is described with reference to the following figures includes a gearwheel 19 which meshes with the least gearwheel 17 of the train 14.

The first gearwheel 10 is carried by a shaft 20 having cylindrical portions 21 and 22 which pivot in ball or roller bearings 23 and 24 and having a cylindrical extension 25 fitted with one or more helical threads for a screw 26 of large pitch.

The screw 26 co-operates with a fixed slack-takeup nut system 27 which is fixed to a plate 28 which is fixed to the table 3. In this case, the nut system comprises two adjustable slack-takeup nuts 29 and 30 and is extended by a lubricant-filled receptacle 31.

Starting from the initial position shown in FIG. 1, when the plate 4 moves towards the table 3 in direction $F_1$ in order to perform cutting or folding operations on parts placed in a strip, rotary motion is communicated to the screw 26 and this motion is multiplied by the gear train 10, 11, 12, 13, 16, and 17. When the plate is subsequently raised, the screw 26 and the above-specified gear train are caused to rotate in the opposite direction.

Figure 2:
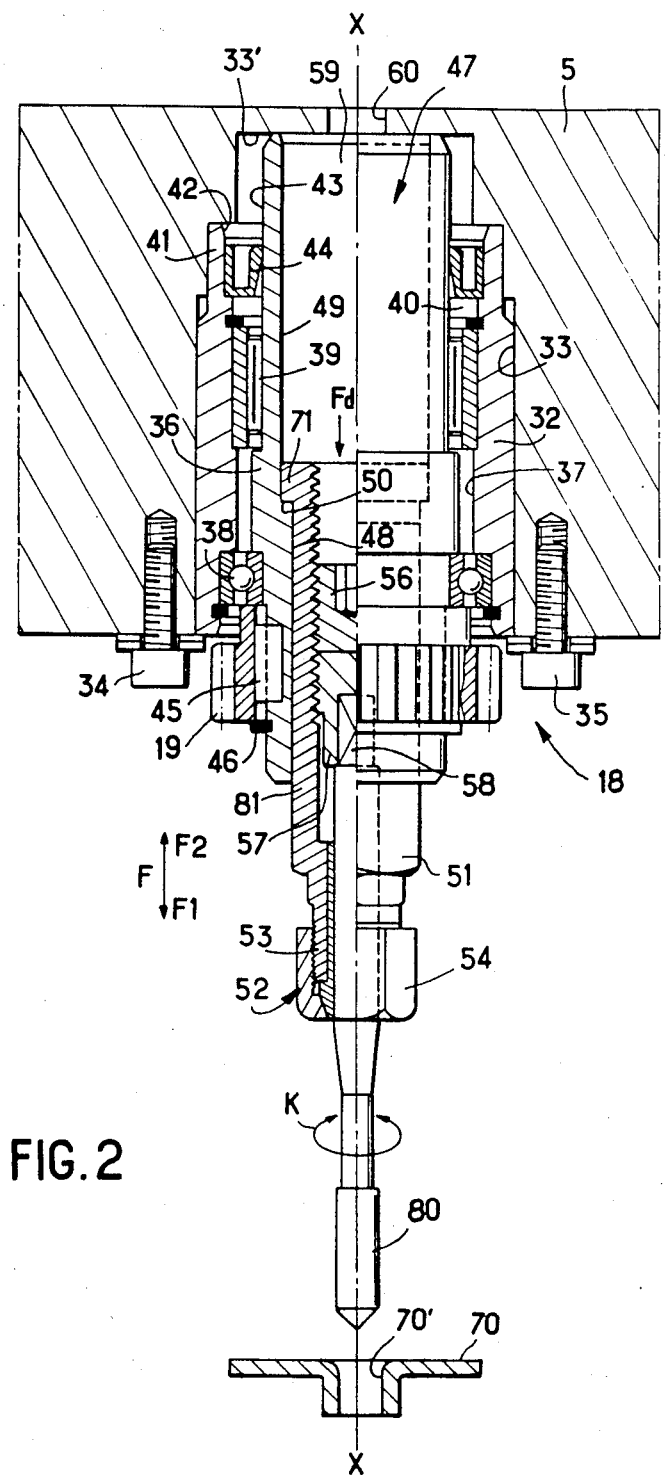
FIG. 2 is a half-section and a half-elevation of a tapping head which includes the characteristics of the invention.

When tapping head 18 which is contained in a tubular cylindrical casing 32 can readily be associated with the body 5 by being received in a cavity 33 in the body 5 in a sealed and fitted manner and can be retained therein by means of screws 35 and 34 shown in FIG. 2.

In this figure it can be seen that a hollow spindle or cylinder 36 is pivotally-mounted and axially-fixed in a bore 37 in the casing by means of ball and roller bearings 38 and 39, and that an annular space 40 located close to the inside end 41 between the inside surface 42 of the housing and the outside surface 43 of the spindle is occupied by a sealing ring 44.

The gearwheel 19 which is keyed to the spindle 36 by a key 45 is held axially by a spring clip 46.

A housing 47 which passes longitudinally throughout the spindle 36 has a first, bottom or outer region 48 of prismatic cross-section (e.g. hexagonal with rounded corners), and a second, top or inner region 49 which is cylindrical and which is separated from the preceding region by a transverse shoulder 50.

A coaxial tool-carrier 51 is mainly constituted by three superposed portions including a first, outer portion 52 having a hollow clamp 53 and a locking nut 54 for holding a tap 80, a second portion 81 of prismatic section which is an exact sliding fit with the region 48, and a third portion 71 constituted by an outwardly-directed flange suitable for coming into abutment on the shoulder 50. A threaded stopper 56 holds a coupling part 57 for driving the stem 58 of a tap.

The above-described tool-carrier may be displaced longitudinally in the direction F, firstly relative to the spindle 36, and secondly relative to the table 3, 28 when the plate 4 is displaced; said tool-carrier can also rotate about the axis XX' together with the spindle.

The rest position of the tool carrier, as shown in FIG. 2, results from the presence of pneumatic pressure in the chamber 59 which is placed above the flange 71, with said fluid pressure being communicated to said chamber via an orifice 60 through the end 33' of the cavity 33, which orifice is connected to a pneumatic connector 62 by means of a channel 61 running through the body 5 (see also FIG. 1).

The connector is fed by means of a flexible hose (shown in part at 63 in FIG. 1) and a pneumatic valve 64 connected in series therewith.

The valve is placed on a wall of the plate 4 of the press, and has a control member 65 which is actuated by an adjustable cam or slope 66 which is fixed to a fixed frame 110 so that fluid feed is switched on and off at a particular position of the plate relative to the frame 110.

The above-described apparatus is implemented in a situation where parts are manufactured from a strip of metal which is displaced stepwise between a punch and a die with successive impressions in the die receiving a portion of the strip at each step which has already been subjected to an operation in the preceding impression; the tapping operation which is to be performed by the head 18 is thus executed at the same rate that is set for the accompanying cutting or folding operations.

When a part 70 of the strip 170 has been brought opposite the tapping head, and when the head is in its high position which corresponds to the top of the plate stroke, pressure P is applied to the chamber 59 via the valve 64, thereby pressing the tool-carrier 51 against the shoulder 71 by a resilient force $F_d$ which is practically constant.

As the plate 4 moves down in the same direction, the tap approaches a hole 70' in the part 70 at constant speed while simultaneously rotating, up to the moment when they engage each other.

If the first thread of the tap does not immediately begin to cut a thread in the part, the tap is temporarily prevented from moving in the longitudinal direction and the tool-carrier is displaced relative to the spindle until the moment that the thread starts to be cut; suitable adjustments of the pressure P and of the position of the cam or slope 66 are obviously necessary to ensure that the longitudinal force to which the tap is subjected, and the nature of the part material, and possibly also the nature of the lubricants used will allow the tap to engage; the pressure P is advantageously adjusted by means of an expander 111 which is preferably fixed to the frame 110 and connected by a flexible hose 112 in order to facilitate the adjustment.

Once the tap has cut a certain number of threads, for example two or three, the threads can act as a nut on the tap which is constantly subjected to a rotary couple K by the movement of the gear train; it is thus unnecessary to continue to apply a force $F_d$ to the tap since such a force would add friction and additional wear on the tool. The application of the pressure P is interrupted by the movement of the valve 64 as soon as these initial two or three threads have been cut, and the pressure continues to be interrupted while the plate rises in the direction $F_2$ and the tap is driven in the opposite direction; optionally, a much smaller pressure p may be applied when the pressure P is interrupted and it in turn may be further reduced or switched off when movement takes place in the direction $F_2$.

The pressure reappears when the plate returns to a portion close to the top of its stroke, and in any case only when the tap is disengaged from the threads which it has just cut.

The advantages of the device described above are due, in particular, from the constant longitudinal force which is applied to the tap, and to the fact that this force (which does not require any mechanical parts to be generated) may be interrupted at any moment along the stroke of the tap; thereby improving manufacturing speed.

The operating defects encountered with the springs used previously can no longer occur in this case.

Although smooth and fitting prismatic surfaces 48 and 81 have been described for providing axially-free rotary coupling without significant leakage between the spindle and the tool-carrier, other cross-sectional shapes (for example oval) could be used and satisfy the needs of such coupling providing they do not have angles where it is difficult to provide sealing; a polygonal cross-section is advantageous because of the need to lock the bottom end of the tool carrier when tightening the clamp 53.

Figure 3:
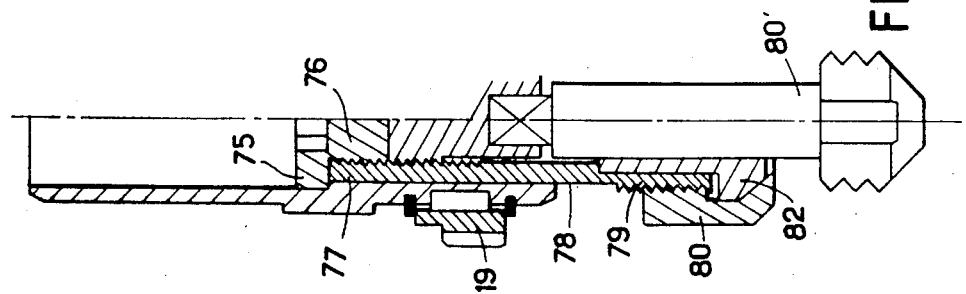
FIG. 3 is a half-section of the head cylinder or spindle receiving a tap-carrier suitable for holding large-diameter taps.

In a first variant embodiment shown in FIG. 3, a flange 75 forming a part of the stopper 76 is added to the inner end 77 of the tool-carrier 78 in order to allow the outer end 79 thereof to be of sufficient diameter to carry a clamp 80, 82 suitable for clamping to larger diameter taps 80'; this flange is added to the tool-carrier so as to allow the tool-carrier to be inserted upwardly into the spindle during assembly.

Figure 4:
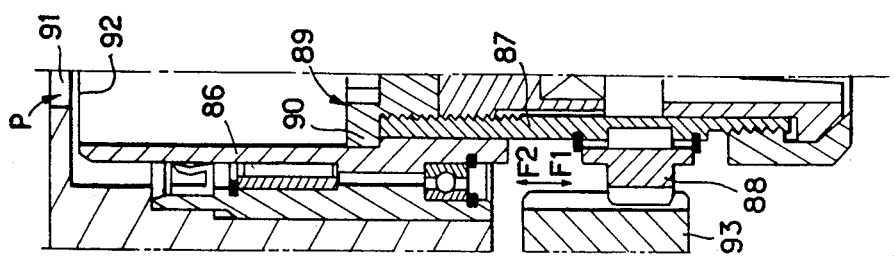
FIG. 4 is a half-section of a tapping head in which the means for rotating the head are modified compared with the means used in the previous figures.

In a second variant embodiment shown in FIG. 4, the spindle 86 serves only as longitudinal and rotary guide means for the tool-carrier 87 which tool-carrier has a drive gearwheel 88 keyed thereto and has the top cross-sectional area 89 of its flange 90 subjected, as before, to pneumatic force which propagates through the orifice 91 and the opening 92.

The height of this drive gearwheel is less than the height of the last gearwheel 93 of the chain which rotates it so as to ensure that meshing continues throughout relative longitudinal motion in directions $F_1$ and $F_2$ between the tool-carrier and the spindle.

Figure 5:
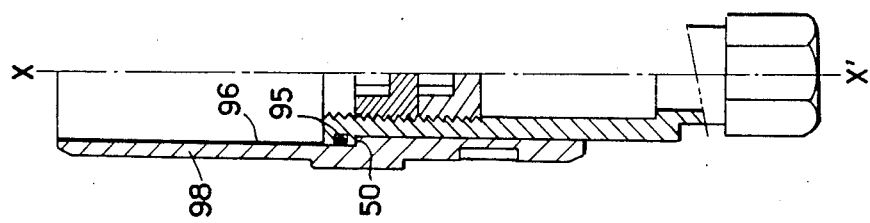

It is not essential to have a sealing ring for preventing the passage of fluid between the surface 48 of the spindle and the surface of the tool-carrier 81 as shown in FIG. 2, providing the transverse play between these two parts is small. The spindle and the tool-carrier from a kind of rotary actuator whose cylinder is constituted by the part 36 and whose piston rod is constituted by the parts 71 and 51. If for some reason such play needs to be larger, a lip seal or an O-ring such as 95 (see FIG. 5) could be placed, for example and preferably, above the shoulder 50 so that it is pressed evenly against the cylindrical inside surface 96 of the spindle 98, thereby keeping its wear to a minimum.

In a third variant embodiment (not shown) which may be advantageous when a large longitudinal force is to be applied to the tap, a rocker placed on the axis of the tool-carrier communicates a large force thereto, which force is developed by a membrane or a bellows which receive the fluid under pressure and which may be located either inside the body or outside the body depending on the disposition thereof.

Figure 6:
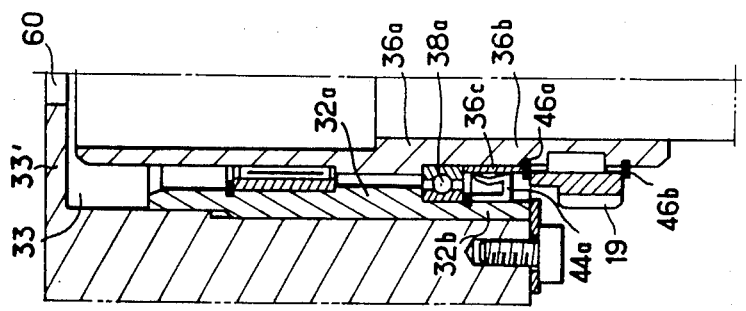
FIGS. 5 and 6 show variant dispositions in accordance with the invention relating to the sealing means which cooperate with the cylinder.

In the embodiment shown in FIG. 2, the lip sealing ring 44 is placed so that the pressure P does not reach the bearings 38 and 39. The seal could also be placed in such a manner as to simultaneously protect the bearings, as shown in FIG. 6 for an embodiment in which the spindle 36a includes a smooth bearing surface 36c in a region 36b at the far end of the housing 33 from the orifice 60 through the end 33', with a seal 44a which is fixed around its periphery against an extension 32b of the casing 32a pressing against said bearing surface 36c. In this case, the gearwheel 19 is axially retained between two spring clips such as 46a and 46b.

The invention is advantageously applicable to machine tools.

I claim:

1. A method of automatically tapping parts disposed in a metal strip which is displaced stepwise between a fixed table of a cutting press and a moving element thereof, said method comprising the steps of:

providing a tapping apparatus comprising a tapping head having an axis of rotation, a tap-carrier connected to said tapping head for carrying a tap, said tap-carrier being movable relative to said tapping head; motion transforming means mounted on a movable element of a press for transforming a stroke of said movable element into a rotary motion of said tapping head to thereby apply a rotary couple to said tap as said movable element moves said tapping head along said axis of rotation, said rotary motion having an amplitude proportional to said stroke; force applying means for applying an axial pneumatic force to said tap-carrier in a direction towards the part to be tapped; and interruption means for interrupting application of said axial pneumatic force when the tap is engaged in said part over a sufficient length, thereby ensuring the tap continues to penetrate in said part solely under the effect of the rotary couple applied thereto;

before each tapping operation, applying said axial pneumatic force to said tap-carrier, said force being selected to be substantially constant and directed towards the parts to be tapped;

interrupting application of said axial pneumatic force at a moment when said tap is engaged in said part over a sufficient length for ensuring said part continues to penetrate in said part solely under the effect of said rotary couple which is communicated thereto.

2. Tapping apparatus suitable for automatically tapping parts disposed in a metal strip, said apparatus comprising:

a tapping head having an axis of rotation;

a tap-carrier connected to said tapping head for carrying a tap, said tap-carrier being movable relative to said tapping head;

motion transforming means mounted on a movable element of a press for transforming a stroke of said movable element into a rotary motion of said tapping head to thereby apply a rotary couple to said tap as said movable element moves said tapping head along said axis of rotation, said rotary motion having an amplitude proportional to said stroke;

force applying means for applying an axial pneumatic force to said tap-carrier in a direction towards the part to be tapped; and interruption means for interrupting application of said axial pneumatic force when said tap is engaged in said part over a sufficient length, thereby ensuring said tap continues to penetrate in said part solely under the effect of said rotary couple applied thereto.

3. Tapping apparatus according to claim 2, wherein said tap-carrier constitutes a rod and piston of an actuator which is slidable in sealed manner in a spindle constituting the actuator cylinder while being angularly fixed relative thereto, said cylinder being rotatably mounted in a casing while said axial pneumatic force is developed by admitting a pneumatic fluid under pressure into a sealed chamber delimited by an end of the tap-carrier, said spindle, said casing, and a concentric sealing means disposed therebetween.

4. Tapping apparatus according to claim 3, wherein said sealing means are placed diametrically between an inside end of the spindle and the casing containing respective bearings and axially between said ends and the tap-carrier, said casing being disposed in sealed manner in the body.

5. Tapping apparatus according to claim 3, wherein the sealing means are placed radially between an internal bearing surface of said casing at the far end thereof from a pressure inlet orifice and an external bearing surface of the spindle or cylinder adjacent to the tap-carrier.

6. Tapping apparatus according to claim 3, wherein a valve is provided for controlling the admission of pneumatic fluid into said chamber and co-operating with an adjustable slope by means of an actuator member for opening and closing the valve and movable with the plate relative to the slope.

7. Tapping apparatus according to claim 6, wherein a pressure regulator is provided upstream from the valve.

8. Tapping apparatus according to claim 3, wherein angular coupling means between the spindle or cylinder and the tap-carrier consist in corresponding longitudinal prismatic surfaces provided on the cylinder and the tap-carrier.

9. Tapping apparatus according to claim 8, wherein said prismatic surfaces are hexagonal in contour.

10. Tapping apparatus according to claim 8, wherein the longitudinal displacement of the tap-carrier is limited by an inside flange on the tap-carrier displaceable with little play along a housing inside the cylinder and on which the above-specified pneumatic pressure is applied, encountering a shoulder in said cylinder and delimiting the prismatic surfaces thereof.

* * * * *